(12) United States Patent
Gebreselassie et al.

(10) Patent No.: US 6,383,320 B1
(45) Date of Patent: May 7, 2002

(54) METHOD OF FORMING A HEADLINER

(75) Inventors: Girma Gebreselassie, Southfield; Harold G. Wolf, Jr., Gibralter, both of MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 09/454,087

(22) Filed: Dec. 3, 1999

(51) Int. Cl.$^7$ .................................................. B27N 3/12
(52) U.S. Cl. ...................... 156/62.6; 156/204; 264/112; 264/122; 264/126
(58) Field of Search ............................... 156/62.2, 62.4, 156/62.6, 204; 264/112, 122, 126; 425/81.1, 83.1; 19/160, 163, 302; 442/389, 392, 403, 405, 407, 411, 415, 416

(56) References Cited

U.S. PATENT DOCUMENTS

| | | |
|---|---|---|
| 3,410,936 A | 11/1968 | Juras |
| 3,872,199 A | 3/1975 | Ottinger |
| 3,992,238 A | 11/1976 | Johns |
| 4,020,207 A | 4/1977 | Alfter et al. |
| 4,131,702 A | 12/1978 | Alfter et al. |
| 4,211,590 A | 7/1980 | Steward et al. |
| 4,327,049 A | 4/1982 | Miller |
| 4,525,321 A | 6/1985 | Tonniges |
| 4,609,519 A | 9/1986 | Pichard et al. |
| 4,767,586 A * | 8/1988 | Radwanski et al. ......... 264/113 |
| 4,795,335 A * | 1/1989 | Farrington et al. ......... 425/82.1 |
| 4,840,832 A * | 6/1989 | Weinle et al. ............... 428/156 |
| 4,927,685 A * | 5/1990 | Marshall et al. ............... 428/74 |
| 4,957,797 A | 9/1990 | Maeda et al. |
| 5,041,260 A | 8/1991 | Johnson et al. |
| 5,057,175 A | 10/1991 | Ashton |
| 5,164,254 A | 11/1992 | Todd et al. |
| 5,217,672 A | 6/1993 | Kelman et al. |
| 5,229,052 A | 7/1993 | Billiu |
| 5,292,577 A | 3/1994 | VanKorrebrouck et al. |
| 5,342,565 A | 8/1994 | Goren |

(List continued on next page.)

FOREIGN PATENT DOCUMENTS

| | | |
|---|---|---|
| DE | 2 015 915 | 9/1979 |
| DE | 93 02 870 | 5/1993 |
| EP | 0 426 317 | 5/1991 |
| EP | 0 569 846 | 11/1993 |
| EP | 0 587 283 | 3/1994 |
| WO | WO89/05717 | 6/1989 |
| WO | WO91/12944 | 8/1994 |
| WO | WO94/17234 | 8/1994 |
| WO | WO97/32752 | 9/1997 |
| WO | WO97/34850 | 9/1997 |
| WO | WO98/22644 | 5/1998 |
| WO | WO98/30371 | 7/1998 |
| WO | WO98/42495 | 10/1998 |
| WO | WO98/55291 | 12/1998 |
| WO | WO99/02335 | 1/1999 |

OTHER PUBLICATIONS

U.S. application No. 09/027,702, Byma et al., filed Feb. 23, 1998.
Railway Engineer International, vol. 5, No. 3, May 1980, Bury St. Edmunds GB, p. 55–56 XP002034798, I F Coleby: "Honeycomb Sandwich Structures".
English translation Corresponding to DE 93 02 870.

(List continued on next page.)

*Primary Examiner*—Jeff H. Aftergut
*Assistant Examiner*—Barbara J. Musser
(74) *Attorney, Agent, or Firm*—Brooks & Kushman P.C.

(57) ABSTRACT

A method of forming a headliner includes providing a lap mat including a first region having a first material composition, and a second region having a second material composition different than the first composition, wherein the second region is configured as at least one of an energy management region and a support region; positioning the mat between two mold sections of a mold; and moving at least one of the mold sections toward the other mold section to shape the mat into a desired shape. A method for forming the mat is also disclosed.

31 Claims, 3 Drawing Sheets

U.S. PATENT DOCUMENTS

| | | |
|---|---|---|
| 5,407,631 A | 4/1995 | Salisbury |
| 5,486,256 A | 1/1996 | Romesberg et al. |
| 5,503,903 A | 4/1996 | Bainbridge et al. |
| 5,536,341 A | 7/1996 | Kelman |
| 5,561,866 A | 10/1996 | O'Kane |
| 5,660,908 A * | 8/1997 | Kelman et al. ............... 478/74 |
| 5,679,296 A | 10/1997 | Kelman et al. |
| 5,683,796 A | 11/1997 | Kornylo et al. |
| 5,700,050 A | 12/1997 | Gonas |
| 5,718,791 A | 2/1998 | Spengler |
| 5,775,565 A | 7/1998 | Sand |
| 5,779,793 A | 7/1998 | Sand |
| 5,823,611 A | 10/1998 | Daniel et al. |
| 5,843,365 A | 12/1998 | Pinson et al. |
| 5,845,458 A | 12/1998 | Patel |
| 5,853,628 A | 12/1998 | Varona |
| 5,853,843 A | 12/1998 | Patel et al. |
| 5,874,136 A | 2/1999 | Michna et al. |
| 5,976,295 A | 11/1999 | Ang |
| 5,981,411 A * | 11/1999 | Brown ...................... 442/364 |
| 6,153,144 A * | 11/2000 | Byma ......................... 264/511 |

OTHER PUBLICATIONS

Jacques H. Gerard and Michael Jander, "Owens–Corning P–4 Technology", $48^{th}$ Annual Conference, Composites Institute, The Society of the Plastics, Industry, Inc., Feb. 8–11, 1993, 1/Session 9–F, pp. 1–7.

* cited by examiner

METHOD OF FORMING A HEADLINER

TECHNICAL FIELD

The invention relates to a method of forming a headliner having an integrally formed energy management region and/or support region.

BACKGROUND ART

U.S. Pat. No. 5,683,796 discloses a method of making a headliner that includes spraying a layer of foamable material, such as liquid polyurethane, on a cover layer. The foamable material is permitted to free-rise or expand so that it has a generally constant density throughout. Consequently, this method is not useful to produce a headliner having different densities at different locations on the headliner. Furthermore, because the foamable material has a uniform composition, this method is also not useful to produce a headliner with multiple and distinct features, such as high strength support regions and/or energy management regions.

A prior method of making a headliner assembly having energy management members, such as head impact pads, includes forming the pads separately from the headliner. The pad forming process includes molding a block of foam, cutting the block into rectangular panels, die-cutting the panels, and compression molding the panels to form the pads. The pads are then attached to a preformed headliner using assembly dies and an adhesive. Because of the multiple steps involved with forming the pads and attaching the pads to the headliner, this method is time consuming and costly. Furthermore, because the pads are die-cut from rectangular panels, this method also results in significant waste.

U.S. Pat. No. 5,845,458 discloses another method of making a headliner having deformable foam inserts disposed on side edges of the headliner. The method includes positioning a cover layer, a foam panel, and preformed rectangular foam inserts in a mold, and draping a flexible backing layer over the foam panel and foam inserts. Suitable adhesives are also positioned between the cover layer and the foam panel, and between the foam panel and the foam inserts. The mold is then closed to compression mold the foam panel and foam inserts, as well as to stiffen the backing layer. Similar to the above method, however, this method involves multiple steps for forming the inserts and attaching the inserts to the remainder of the headliner.

It would be desirable to provide an improved method of incorporating energy management and/or support characteristics into a headliner structure.

DISCLOSURE OF INVENTION

The invention overcomes the shortcomings of the prior art by providing an improved method of forming a headliner using a lap mat having an integrally formed energy management region and/or support region.

Under the invention, a method of forming a headliner includes providing a lap mat including a first region having a first material composition, and a second region having a second material composition different than the first material composition, wherein the second region is configured as at least one of an energy management region and a support region; positioning the mat between two mold sections of a mold; and moving at least one of the mold sections toward the other mold section to shape the mat into a desired shape.

The method may also include differentially heating the mat such that at least a portion of the second region is heated to a different temperature than the first region. For example, the second region may be heated to a higher temperature than the first region, such that the second region may experience more crystallization and/or be compressed more during the manufacturing process than the first region. As a result, the second region may be provided with a greater density than the first region.

Further under the invention, a method of forming a headliner includes providing a cross-lap mat including a major region having a first fiber composition, and a plurality of localized regions having a second fiber composition different than the first fiber composition; heating the mat; positioning the mat between two mold sections of a mold; and moving at least one of the mold sections toward the other mold section to shape the mat into a desired shape and thereby form the headliner, such that at least one of the localized regions is positioned proximate a peripheral edge of the headliner to provide energy management, and another of the localized regions is positioned proximate a central portion of the headliner to provide resistance to sag.

A method of forming a lap mat for use in a subsequent molding operation to form a headliner is also provided. The method includes forming a first continuous layer of fibers; folding the first continuous layer to form a plurality of first fibrous layers; and binding the first fibrous layers together; wherein the first fibrous layers cooperate to define a first region having a first fiber composition, and a second region having a second material composition different than the first fiber composition.

Binding the first fibrous layers together may include needle punching the first fibrous layers together. Alternatively, binding the first fibrous layers together may include heating the first fibrous layers and forcing the first fibrous layers together.

The method of forming the lap mat may further include positioning additional material between at least two of the first fibrous layers, such that the additional material cooperates with the first fibrous layers to define the second region.

The method of forming the lap mat may also include introducing a second fibrous layer between two first fibrous layers, wherein the second fibrous layer cooperates with the first fibrous layers to define the first and second regions. Furthermore, fibers of the first fibrous layers may be generally oriented in a first direction, and fibers of the second fibrous layer may be generally oriented in a second direction different than the first direction.

A method of forming a cross-lap mat for use in a subsequent molding operation to form a headliner includes forming a first continuous layer of fibers; forming a second continuous layer of fibers; folding the first continuous layer to form a plurality of first fibrous layers; folding the second continuous layer to form a plurality of second fibrous layers; joining the first and second fibrous layers together such that at least one of the second fibrous layers is disposed between two first fibrous layers, and binding the first and second fibrous layers together to form the mat; wherein the first and second fibrous layers cooperate to define a first major region having a first fiber composition, and a second localized region having a second material composition different than the first fiber composition, and wherein fibers of the first fibrous layers are oriented generally in a first direction, and fibers of the second fibrous layers are oriented generally in a second direction different than the first direction.

These and other objects, features and advantages of the invention are readily apparent from the following detailed description of the best modes for carrying out the invention when taken in conjunction with the accompanying drawings.

BRIEF DESCRIPTION OF DRAWINGS

FIGS. 1(1a and 1b) is a schematic diagram of an apparatus for practicing the method according to the invention for forming a headliner assembly using a lap mat that is formed from a first continuous layer;

BEST MODES FOR CARRYING OUT THE INVENTION

Figure 1A:
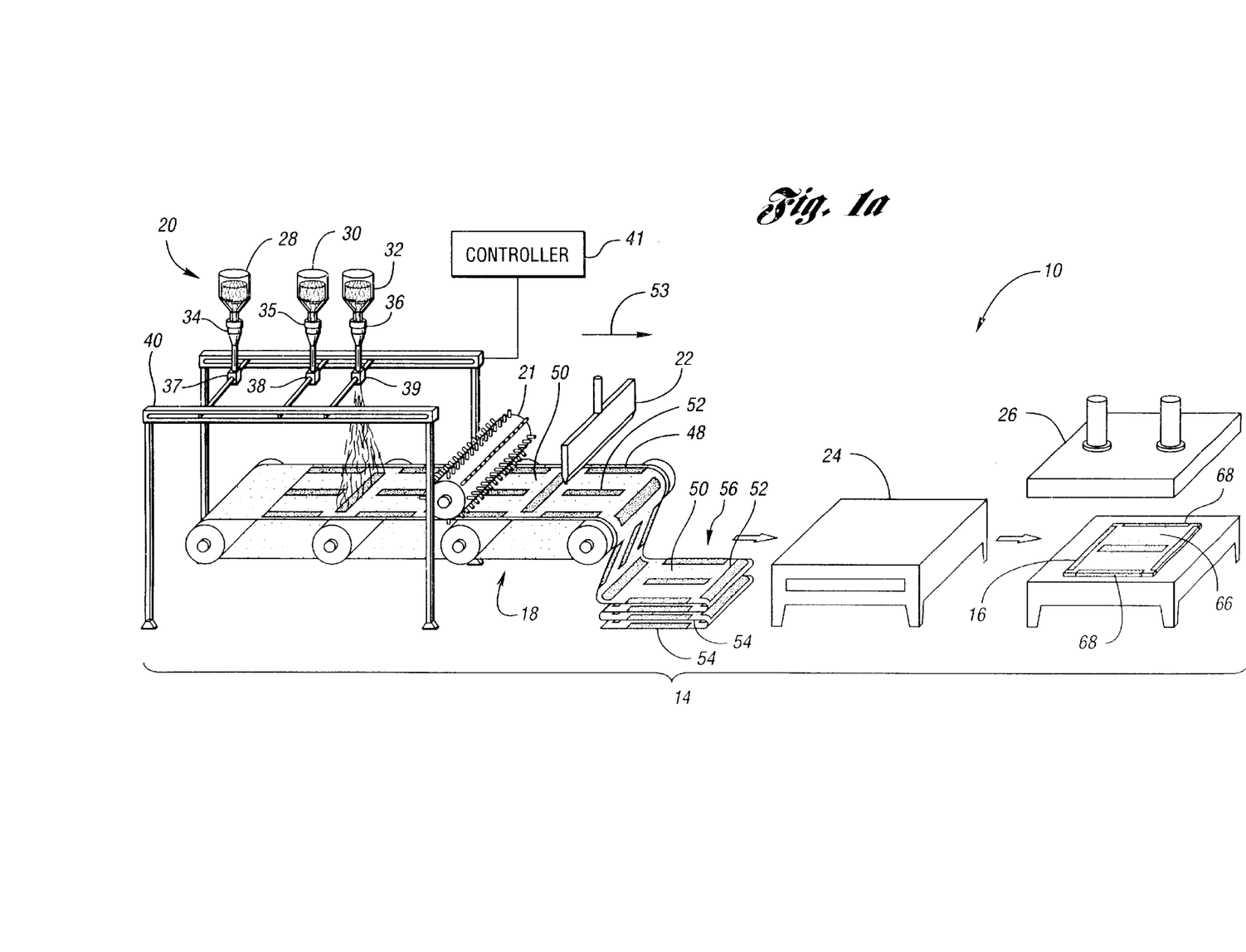
Figure 1B:
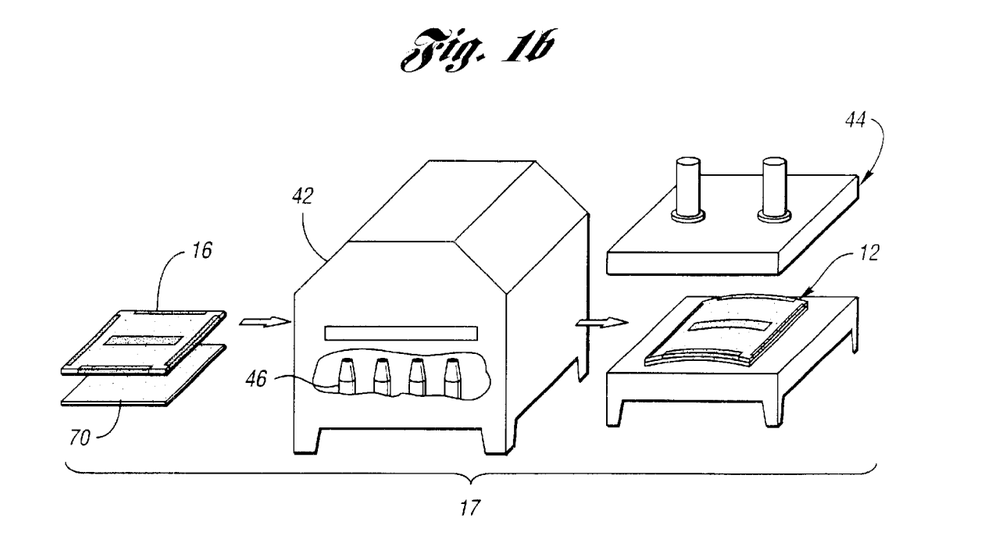

FIG. 1 shows an apparatus 10 for forming a headliner assembly 12 according to the invention for use with a motor vehicle. The apparatus 10 includes a mat forming portion 14 for forming a preform or lap mat 16, and a molding portion 17 for forming the mat 16 into the headliner assembly 12. While the mat forming portion 14 and the molding portion 17 may be disposed at a single location, such as a manufacturing plant, the mat forming portion 14 and molding portion 17 may be at different locations.

The mat forming portion 14 includes a conveyor system 18, a particulate depositing device such as a particulate applicator 20, a particulate orienting device such as a carding device 21, a cutting device 22, a first heating device such as a first oven 24, and a first press or mold 26. The particulate applicator 20 is preferably disposed above the conveyor system 18 for selectively blowing or otherwise depositing particulate material onto the conveyor system 18. The particulate applicator 20 includes one or more sources 28, 30 and 32 of material, each of which contains one or more types of formable natural and/or synthetic material. Preferably, at least one of the sources 28, 30 and 32 contains a different composition of material than another of the sources 28, 30 and 32. The material is preferably in the form of particles such as fibers, beads and/or pellets. However, the material may have any suitable configuration such as continuous fibers. The natural material may be any suitable material such as jute, wood, kenaf and/or flax. The synthetic material is preferably a thermoplastic material such as polyester, nylon, polyethylene and/or polypropylene. Alternatively, the synthetic material may be any suitable polymeric material, including thermosetting material, or other synthetic material such as fiberglass.

Each of the material sources 28, 30 and 32 is preferably connected to a dedicated chopping or cutting device 34, 35 and 36, respectively, for chopping the material into particles such as fibers, beads and/or pellets, if, for example, the material in the material sources 28, 30 and 32 is not already in particle form, or if smaller size particles are required for a particular application. Consequently, the material sources 28, 30 and 32 may contain bales or spools of densely packed material, such as fibers, which require significantly less storage space compared with preformed lofted layers of fibrous material. Alternatively, one or more of the cutting devices 34, 35 and 36 may be eliminated if, for example, the material sources 28, 30 and 32 contain preformed particles that do not require chopping or cutting such as polystyrene beads. Each of the cutting devices 34, 35 and 36 is connected to a respective applicator head 37, 38 and 39 for blowing or otherwise depositing the particles onto the conveyor system 18. The applicator heads 37, 38 and 39 are preferably movably connected to a frame 40 such that each applicator head 37, 38 and 39 can be moved along x and y axes over a portion of the conveyor system 18. In addition, the particulate applicator 20 may be configured such that each applicator head 37, 38 and 39 is movable along a z axis as well. The particulate applicator 20 also preferably includes a programmable controller 41 for controlling movement of the applicator heads 37, 38 and 39 and deposition of particles onto the conveyor system 18. Alternatively, the particulate applicator 20 may have any suitable configuration sufficient to deposit material onto the conveyor system 18, such as a robotic arm connected to one or more sources of material and movable along x, y and z axes.

The molding portion 17 includes a second heating device such as a second oven 42, and a second press or mold 44. The second oven 42 is preferably a convective heat oven, and includes a plurality of flow regulating devices such as air nozzles 46 for controlling air flow to the mat 16.

The method according to the invention for forming the headliner assembly 12 includes feeding material from one or more of the sources 28, 30 and 32 into one or more of the cutting devices 34, 35 and 36 where the material is chopped into particles such as fibers. Next, the chopped particles are selectively deposited onto the conveyor system 18 by one or more of the applicator heads 37, 38 and 39 to form a first continuous particulate layer 48. The first particulate layer 48 preferably has one or more first major zones 50 with a first material composition, and a plurality of second localized zones 52 having a second material composition different than the first material composition. As used herein, the term "material composition" means material makeup. Furthermore, different material compositions may comprise different materials and/or different combinations of the same materials. For example, the first zones 50 may comprise a different material or materials than the second zones. As another example, the first zones 50 and the second zones 52 may each comprise bi-component polyester fibers, but the fibers of the first zones 50 may be provided with more high-melting-temperature component and less low-meting-temperature component as compared with fibers of the second zones 52. Thus, the first zones 50 may be provided with a different ratio of high-melting temperature component to low-melting-temperature component as compared with the second zones 52. Furthermore, it is to be understood that the second fiber composition may not be the same for all of the second zones 52.

The method continues by orienting the particles of the first particulate layer 48 with the carding device 21, if, for example, the particles are fibers. The carding device 21 may be used to orient the particles generally in a first direction 53, which is generally parallel to the direction of motion of the conveyor system 18.

Next, the first particulate layer 48 is folded upon itself to form a plurality of first layers 54. Advantageously, the number of layers 54 can be controlled to achieve a desired thickness. Once the desired thickness has been achieved, the particulate layer 48 is cut by the cutting device 22 to form a blank 56. The blank 56 may also be cut or trimmed so that the blank 56 has a size corresponding to the desired size of the headliner assembly 12.

Figure 2:
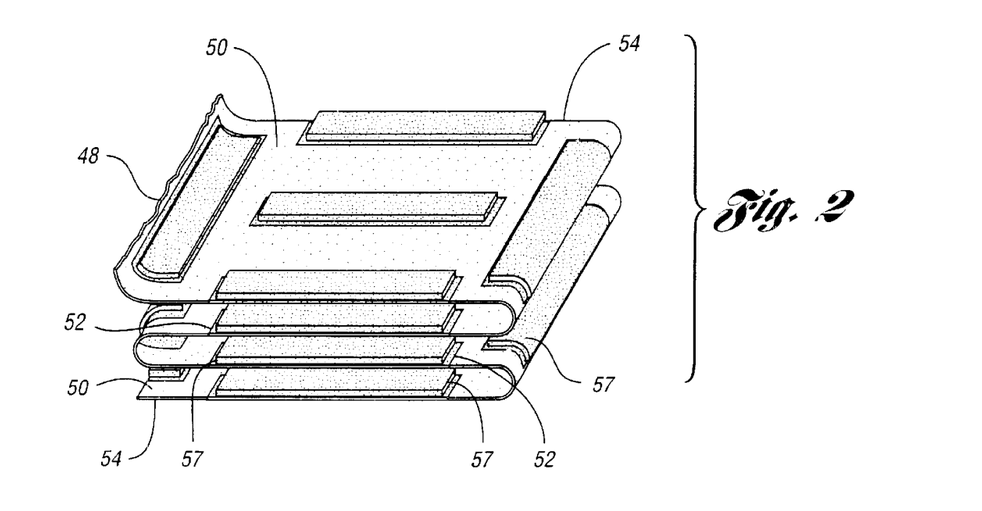
FIG. 2 is a fragmentary view of the first continuous particulate layer according to the invention folded upon itself to form a plurality of first layers.
Figure 3:
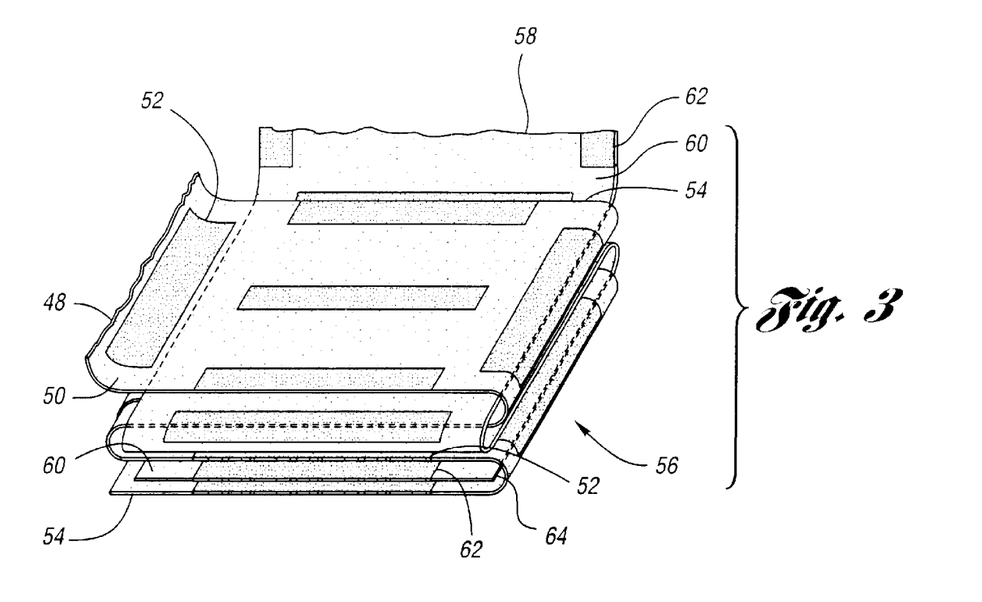
FIG. 3 is a fragmentary view of the first continuous particulate layer and a second continuous particulate layer according to the invention, wherein the second continuous particulate layer is folded upon itself to form a plurality of second layers such that the second layers alternate with the first layers of the first continuous particulate layer.

As shown in FIG. 2, additional material 57, such as fibers or foam pieces, may also be deposited or otherwise positioned between the first layers 54. For example, additional fibers may be positioned between the second zones 52 of adjacent first layers 54. Alternatively or supplementally, as shown in FIG. 3, a second continuous particulate layer 58 may be formed in a manner similar to the first particulate layer 48, such that the second particulate layer 58 comprises particles, such as fibers, generally oriented in a second direction different than the first direction 53. Preferably, the second direction is perpendicular to the first direction 53. The second particulate layer 58 may also include one or more third major zones 60 having a third material composition, and a plurality of fourth localized zones 62 having a fourth material composition different than the third material composition. Preferably, the third zones 60 are similar to the first zones 50 of the first particulate layer 48, and the fourth zones 62 are similar to the second localized zones 52. The second particulate layer 58 may also be folded upon itself to form a plurality of second layers 64, such that the second layers 64 alternate with the first layers 54 to form the blank 56.

Returning to FIG. 1, the method continues by heating the blank 56, and binding the first layers 54 together to form the mat 16. For example, the blank 56 may be heated using the oven 24. After heating, the blank 56 may be pressed in the first mold 26 to bind the first layers 54 together. Alternatively, the heating step may be eliminated, and the first layers 54 may be adhered together by needle-punching the first layers 54 together.

If the mat 16 includes only first layers 54, then the mat 16 may be referred to as a vertical lap mat. If the mat 16 includes first layers 54 as well as the second layers 64 described above, then the mat 16 may be referred to as a cross-lap mat. As used herein, the term lap mat refers to a vertical lap mat as well as a cross-lap mat. Furthermore, while the mat 16 may comprise any suitable number of layers 54 and/or 64, the mat 16 preferably comprises 10 to 40 layers 54 and/or 64.

The mat 16 includes a first major region 66 and a plurality of second localized regions 68. The first zones 50 and the third zones 60, if the second particulate layer 58 is used, cooperate to define the first region 66. The second zones 52 and the fourth zones 62, if the second particulate layer 58 is used, cooperate to define the second regions 68. The second regions 68 may also include any additional material 57 that may be positioned between the first layers 54 and/or the second layers 64, if the second particulate layer 58 is used.

Next, the mat 16 is inserted into a heating device, such as the second oven 42, along with a cover layer 70, if desired. Advantageously, the air nozzles 46 may be used to differentially heat the mat 16. For example, heated air may be concentrated on the second regions 68 so that the second regions 68 are heated to a higher temperature than the first region 66. Alternatively, the heating device may be a steam source, a contact heater with one or more heat-conducting surfaces which may be applied to one or more surfaces of the material to be heated, or any other heating means known to those skilled in the art.

The mat 16 and cover layer 70 are then inserted into the second mold 44 where they are bonded together and molded into a desired final shape and/or thickness, thereby forming the headliner assembly 12. An adhesive may also be used to further bond together the mat 16 and cover layer 70.

Figure 4:
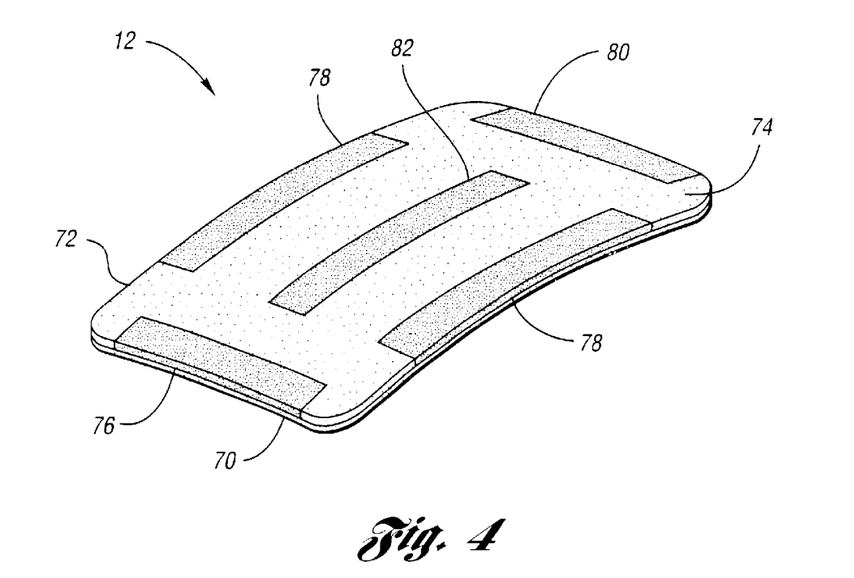
FIG. 4 is a perspective view of the headliner assembly made by the method according to the invention.

FIG. 4 is an enlarged view of the headliner assembly 12 according to the invention. The headliner assembly 12 includes the cover layer 70, which provides an aesthetic appearance when the headliner assembly 12 is installed in the vehicle, and a body 72. The body 72 includes a first major region 74 and a plurality of second localized regions, such as a front localized region 76, side localized regions 78, a rear localized region 80, and a central localized region 82. The major region 74 corresponds to the first region 66 shown in FIG. 1, and the localized regions 76, 78, 80 and 82 correspond to the second regions 68 shown in FIG. 1.

The localized regions 76, 78 and 80 are preferably configured to provide energy absorption or management, such as head impact cushioning, while the localized region 82 is preferably configured to provide support to the headliner assembly 12 during use. For example, because the localized regions 76, 78, 80 and 82 may comprise more low-melting-temperature polyester fibers than the major region 74, the localized regions 76, 78, 80 and 82 may experience more crystallization during the manufacturing process as compared with the major region 74. Furthermore, because the localized regions 76, 78, 80 and 82 may be heated to a higher temperature than the major region 74, the localized regions 76, 78, 80 and 82 may be compressed more during the manufacturing process. Consequently, each of the localized regions 76, 78, 80 and 82 may have a greater density than the major region 74, such that the localized regions 76, 78 and 80 can provide optimum energy management, and the localized region 82 can provide optimum structural support. As another example, the localized regions 76, 78 and 80 may comprise plastic beads, such as expanded polypropylene beads, for energy management purposes, and the localized region 82 may comprise reinforcing particles, such as fiberglass.

Preferably, the body 72 comprises only polyester fibers and/or other polyester particles, and the cover layer 70 comprises only polyester material such that the headliner assembly 12 is recyclable as a unit. Alternatively, the body 72 and cover layer 70 may comprise any suitable material such as described above in greater detail.

Because the localized regions 76, 78 and 80 are integrally formed as part of the mat 16, the method of the invention involves significantly fewer steps and less equipment and tooling than prior methods that involve separately forming head impact pads using multiple molds, checking the configuration of the pads using multiple check fixtures, and attaching the pads to preformed headliners using adhesives. Furthermore, because pads are not individually handled and stored, this method involves lower inventory and part handling costs compared with prior methods. As a result, manufacturing costs are significantly reduced under this method.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming a headliner, the method comprising:

providing a lap mat that is formed from a continuous particulate layer having a non-uniform composition including multiple folded particulate layers that cooperate to define , a first region having a first material composition, and a second region having a second material composition different than the first material composition, wherein the second region is configured as at least one of an energy management region and a support region;

positioning the mat between two mold sections of a mold; and moving at least one of the mold sections toward the other mold section to shape the mat into a desired shape.

2. The method of claim 1 further comprising heating the mat prior to positioning the mat between the mold sections.

3. The method of claim 2 wherein heating the mat comprises convectively heating the mat using hot air.

4. The method of claim 2 wherein heating the mat comprises differentially heating the mat such that at least a portion of the second region is heated to a different temperature than the first region.

5. The method of claim 1 wherein the first material composition includes a first polyester fiber component ratio, and the second composition includes a second polyester fiber component ratio different than the first ratio.

6. The method of claim 1 wherein the second material composition includes natural fibers.

7. A method of forming a headliner, the method comprising:

providing a cross-lap mat including multiple particulate layers, each layer having a non-uniform composition, the layers cooperating to define a major region having a first fiber composition, and a plurality of localized regions having a second fiber composition different than the first fiber composition;

heating the mat;

positioning the mat between two mold sections of a mold; and moving at least one of the mold sections toward the other mold section to shape the mat into a desired shape and thereby form the headliner, such that at least one of the localized regions is positioned proximate a peripheral edge of the headliner to provide energy management, and another of the localized regions is positioned proximate a central portion of the headliner to provide resistance to sag.

8. The method of claim 7 wherein the second fiber composition of one of the localized regions is different than the second fiber composition of another of the localized regions.

9. The method of claim 7 wherein heating the mat comprises convectively heating the mat using hot air.

10. The method of claim 7 wherein heating the mat comprises differentially heating the mat such that a portion of at least one of the localized regions is heated to a different temperature than the major region.

11. A method of forming a headliner, the method comprising:

forming a first continuous layer of fibers including a plurality of first zones having a first material composition, and a plurality of second zones having a second material composition different than the first material composition;

folding the first continuous layer to form a plurality of first fibrous layers;

binding the first fibrous layers together to form a lap mat, the mat having a first major region that includes the first zones, and a second localized region that includes the second zones, the mat further having a non-uniform composition;

positioning the mat between two mold sections of a mold; and moving at least one of the mold sections toward the other mold section to shape the mat into a desired shape such that the second localized region has a greater density than the first major region.

12. The method of claim 2 wherein heating the mat comprises differentially heating the mat in an oven having multiple flow regulating devices for concentrating heated air flow on the second region, such that at least a portion of the second region is heated to a higher temperature than the first region.

13. The method of claim 12 wherein the flow regulating devices are air nozzles.

14. The method of claim 1 wherein each of the particulate layers has a first zone having the first material composition and a second zone having the second material composition, and wherein the first zones of adjacent fibrous layers are aligned with each other so as to define the first region, and the second zones of adjacent fibrous layers are aligned with each other so as to define the second region.

15. The method of claim 1 wherein the lap mat includes multiple localized second regions that are spaced away from each other, and wherein each of the particulate layers has a first zone having the first material composition and multiple second zones having the second material composition, the first zones of adjacent particulate layers being aligned with each other so as to define the first region, and the second zones of adjacent particulate layers being aligned with each other so as to define the second regions.

16. The method of claim 7 wherein heating the mat comprises differentially heating the mat in an oven having multiple flow regulating devices for concentrating heated air flow on the localized regions, such that at least a portion of each localized region is heated to a higher temperature than the major region.

17. The method of claim 16 wherein the flow regulating devices are air nozzles.

18. The method of claim 7 wherein the mat includes multiple folded first layers and multiple folded second layers that alternate with the first layers, each first layer including a first zone having the first fiber composition and a plurality of localized second zones having the second fiber composition, each second layer including a third zone having the first fiber composition and a plurality of localized fourth zones having the second fiber composition, and wherein the first and third zones cooperate to define the major region, and the second and fourth zones cooperate to define the localized regions.

19. The method of claim 11 wherein each first fibrous layer includes a first zone and a second zone, and wherein binding the first fibrous layers together to form a lap mat includes binding the first fibrous layers together such that the first zones of adjacent first fibrous layers are aligned with each other and cooperate to define the first major region, and such that the second zones of adjacent first fibrous layers are aligned with each other and cooperate to define the second localized region.

20. The method of claim 19 wherein the second localized region is positioned proximate a peripheral edge of the mat to provide energy management.

21. The method of claim 19 wherein the second localized region is positioned proximate a central portion of the mat to provide resistance to sag.

22. The method of claim 19 further comprising positioning additional material between the second zones of adjacent first fibrous layers prior to binding the first fibrous layers together, wherein the additional material cooperates with the second zones to define the second localized region.

23. The method of claim 22 wherein the additional material includes fibers.

24. The method of claim 22 wherein the additional material includes foam pieces.

25. The method of claim 11 wherein forming a first continuous layer of fibers includes selectively depositing fibers onto a first conveyor system.

26. The method of claim 11 further comprising:

forming a second continuous layer of fibers including a plurality of third zones having the first material composition and a plurality of fourth zones having the second material composition;

folding the second continuous layer to form a plurality of second fibrous layers such that the second fibrous layers alternate with the first fibrous layers; and binding the first fibrous layers to the second fibrous layers such that the first zones cooperate with the third zones to define the first major region, and such that the second zones cooperate with the fourth zones to define the second localized region.

27. The method of claim 26 wherein forming a first continuous layer of fibers comprises forming the first continuous layer such that the fibers of the first continuous layer are generally oriented in a first direction, and wherein forming a second continuous layer of fibers comprises forming the second continuous layer such that the fibers of the second continuous layer are generally oriented in a second direction different than the first direction.

28. The method of claim 26 wherein forming a second continuous layer of fibers includes selectively depositing fibers onto a second conveyor system.

29. The method of claim 11 wherein each material composition includes low-melting temperature polyester fibers, and the second material composition includes more low-melting temperature polyester fibers than the first material composition.

30. The method of claim 11 wherein the second material composition includes expanded polypropylene beads.

31. The method of claim 11 wherein the second material composition includes fiberglass.

* * * * *

UNITED STATES PATENT AND TRADEMARK OFFICE
CERTIFICATE OF CORRECTION

PATENT NO. : 6,383,320 B1
DATED : May 7, 2002
INVENTOR(S) : Girma Gebreselassie et al.

It is certified that error appears in the above-identified patent and that said Letters Patent is hereby corrected as shown below:

Column 6,
Line 63, after "composition" insert -- , the mat --.
Line 65, after "define" and before "a" delete "," the comma.

Column 8,
Line 16, delete "fibrous", and insert -- particulate -- therefor.
Line 18, delete "fibrous", and insert -- particulate -- therefor.

Signed and Sealed this

Twenty-second Day of October, 2002

Attest:

JAMES E. ROGAN
Attesting Officer
Director of the United States Patent and Trademark Office